(12) United States Patent
Gateshki et al.

(10) Patent No.: US 12,405,234 B2
(45) Date of Patent: Sep. 2, 2025

(54) SAMPLE HOLDER FOR AN X-RAY ANALYSIS APPARATUS

(71) Applicant: Malvern Panalytical B.V., Almelo (NL)

(72) Inventors: Milen Gateshki, Almelo (NL); Detlef Beckers, Almelo (NL); Jan Vugteveen, Almelo (NL)

(73) Assignee: Malvern Panalytical B.V., Almelo (NL)

( * ) Notice: Subject to any disclaimer, the term of this patent is extended or adjusted under 35 U.S.C. 154(b) by 68 days.

(21) Appl. No.: 18/014,401

(22) PCT Filed: Aug. 26, 2021

(86) PCT No.: PCT/EP2021/073622
§ 371 (c)(1),
(2) Date: Jan. 4, 2023

(87) PCT Pub. No.: WO2022/043440
PCT Pub. Date: Mar. 3, 2022

(65) Prior Publication Data
US 2023/0258584 A1 Aug. 17, 2023

(30) Foreign Application Priority Data

Aug. 26, 2020 (EP) .................................... 20192983

(51) Int. Cl.
*G01N 23/20025* (2018.01)
*G01N 23/207* (2018.01)
(52) U.S. Cl.
CPC ..... *G01N 23/20025* (2013.01); *G01N 23/207* (2013.01); *G01N 2223/056* (2013.01); *G01N 2223/1016* (2013.01); *G01N 2223/307* (2013.01); *G01N 2223/309* (2013.01)

(58) Field of Classification Search
None
See application file for complete search history.

(56) References Cited

U.S. PATENT DOCUMENTS

| 4,278,883 A | 7/1981 | Hathaway et al. |
| 5,084,910 A | 1/1992 | Albe et al. |
| 5,390,230 A | 2/1995 | Chang |

(Continued)

FOREIGN PATENT DOCUMENTS

| EP | 1357377 | 10/2003 |
| EP | 3619525 | 3/2020 |

(Continued)

OTHER PUBLICATIONS

Translation of KR 20160015609 A cited in the IDS (Year: 2016).*
(Continued)

*Primary Examiner* — Thomas R Artman
(74) *Attorney, Agent, or Firm* — Leason Ellis LLP (57) ABSTRACT

The present invention relates to sample holder for holding a sample. The sample holder comprises a body having an incident surface and an opening in the body for receiving a sample. When the sample is irradiated with X-rays the incident surface of the sample holder may also be irradiated, especially at low incident angles. To reduce background scattering from the incident surface, the incident surface comprises a protrusion for blocking X-rays.

17 Claims, 8 Drawing Sheets

(56) References Cited

U.S. PATENT DOCUMENTS

| | | | | |
|---|---|---|---|---|
| 6,748,048 | B2* | 6/2004 | Dosho | G01N 23/20025 |
| | | | | 378/80 |
| 10,775,324 | B2* | 9/2020 | Matsuda | G01N 23/20025 |
| 10,794,844 | B2* | 10/2020 | Vukotic | G01N 23/20025 |
| 11,346,794 | B2* | 5/2022 | Vukotic | G01N 23/207 |
| 2003/0095634 | A1* | 5/2003 | Dosho | G21K 1/025 |
| | | | | 378/160 |
| 2019/0178823 | A1 | 6/2019 | Vukotic et al. | |
| 2019/0346384 | A1* | 11/2019 | Matsuda | G01N 23/223 |
| 2021/0055236 | A1* | 2/2021 | Vukotic | G01N 23/207 |
| 2023/0258584 | A1* | 8/2023 | Gateshki | G01N 23/207 |
| | | | | 378/1 |

FOREIGN PATENT DOCUMENTS

| | | |
|---|---|---|
| JP | H5-302930 A | 11/1993 |
| JP | H9-210884 A | 8/1997 |
| JP | 2001-147207 A | 5/2001 |
| JP | 2004-45064 A | 2/2004 |
| KR | 100967407 | 7/2010 |
| KR | 20160015609 | 2/2016 |

OTHER PUBLICATIONS

International Search Report in PCT Application No. PCT/EP2021/073622, mailed Nov. 15, 2021 (4 pages).
Notification of Reasons for Rejection in JP Application No. 2023-509367, mailed May 13, 2025 (3 pages).

* cited by examiner

SAMPLE HOLDER FOR AN X-RAY ANALYSIS APPARATUS

CROSS-REFERENCE TO RELATED PATENT APPLICATIONS

This application is a U.S. National Phase Application under 35 U.S.C. § 371 of International Patent Application No. PCT/EP2021/073622, filed Aug. 26, 2021, which claims the priority from European Application No. 20192983.3, filed Aug. 26, 2020, all of which are incorporated by reference, as if expressly set forth in their respective entireties herein.

FIELD OF THE INVENTION

The present invention relates to a sample holder for supporting a sample and a method of using a sample holder whilst carrying out X-ray analysis on a sample.

BACKGROUND

In the field of material science, X-ray analysis can be used to analyse the material of a sample. The sample is placed in an incident X-ray beam path, between an X-ray source and an X-ray detector. The X-ray detector is arranged to detect X-rays emitted or scattered by the sample. During analysis, the sample is contained in a sample holder.

For some types of X-ray analysis methods, such as X-ray diffraction e.g. Bragg Brentano, the sample is held in a body having a cavity. In "reflection geometry", the X-ray source irradiates an incident surface of the sample, and the X-ray detector is arranged on the same side of the incident surface of the sample as the X-ray source, to detect X-rays scattered or reflected from the incident surface. In some cases, in particular when carrying out X-ray diffraction analysis to analyse the crystalline phases of a sample (e.g. a powder sample), it is desirable to rotate the sample during the X-ray analysis measurement.

In order to obtain high quality results, it is important that the surface of the sample holder is very flat. This is to allow the correct and accurate positioning of the sample surface during the X-ray analysis measurement, otherwise results of the measurements/analysis may be compromised.

X-ray analysis apparatuses often include additional components in the incident and/or scattered X-ray beam. For example, X-ray analysis apparatuses typically include X-ray optics such as collimators and/or beam-shaping components. However, the various components of the X-ray analysis apparatus can give rise to background scattering (i.e. the scattering of X-rays by something other than the sample under analysis), which may compromise the results of the analysis. The sample holder is one potential source of background scattering. Background scattering from the sample holder is particularly problematic at low measurement angles.

It is therefore desirable to minimise sources of background scattering where possible, and to take account of background scattering during analysis of the results.

SUMMARY

According to an aspect of the invention, there is provided a sample holder for holding a sample, the sample holder comprising: a body having a base and an incident surface; and an opening in the body for receiving the sample, the opening extending from the incident surface towards the base, wherein the incident surface comprises a protrusion for blocking at least some X-rays incident on the incident surface, wherein the protrusion is formed in a region surrounding the opening. In this regard, the region between the protrusion and the incident surface may be considered a recess, and the region of the incident surface that does not form part of the protrusion may define a floor of the recess.

The sample holder may be an X-ray diffraction sample holder. The sample may include polycrystalline samples, such as solids, powders, or compacted powders. As such, the sample holder may be an X-ray diffraction polycrystalline sample holder. In this regard, the sample holder may be an X-ray diffraction powder sample holder, an X-ray diffraction compacted powder sample holder, or an X-ray diffraction solid sample holder.

The protrusion may be formed in a region of the body peripheral to the opening. The opening, in which the sample is received, may be in a central region of the body. Accordingly, the protrusion may be formed in a peripheral region of the body, surrounding the central region of the body.

In some embodiments, the sample is in the opening and the incident surface of the sample holder is free of the sample. Because the incident surface of the sample holder is free of the sample, it is exposed to X-rays. In particular, the recess is free of the sample.

In use, X-rays from an X-ray source are directed towards the sample. X-rays diffracted by the sample are detected by an X-ray detector. By preventing at least some X-rays scattered at the incident surface of the sample holder (as opposed to X-rays diffracted by the sample), from reaching the detector, background scattering is reduced.

The protrusion may comprise material that is substantially opaque to X-rays. For example, the material may absorb 90% of Cu K-alpha X-rays, and transmit 10% of Cu K-alpha X-rays. Accordingly, the protrusion prevents X-rays incident on it from being scattered through the protrusion, thereby preventing the scattered X-rays from reaching the X-ray detector. In particular, the protrusion is arranged such that at least some X-rays incident on the recess at low angles (e.g. less than 1.5 degrees), and scattered at recess, are blocked by the protrusion.

The incident surface may comprise a plurality of protrusions and a plurality of recesses.

The protrusions and recesses are formed in a region of the body peripheral to the opening.

In some embodiments, the sample is in the opening and the incident surface of the sample holder is free of the sample. The incident surface of the sample holder may accordingly be exposed to X-rays from an X-ray source. In particular, the recesses are free of the sample.

Each of the protrusions and recesses may extend around the opening. The protrusions may comprise material that is opaque to X-rays.

Each protrusion may surround the opening and a recess may be defined between each protrusion and a neighbouring protrusion. Preferably the region of the incident surface between the protrusion and the neighbouring protrusion forms a floor of the recess.

The protrusions may surround the opening in a plan view of the incident surface. Each protrusion may be continuous. Each protrusion may extend around the opening in a closed loop. Alternatively, each protrusion may surround at least 50% of the circumference of the opening (for example, the protrusion may be a semi-circular shape in plan view). The recess may be defined by its floor and opposing walls of a pair of neighbouring protrusions. The neighbouring protrusions may be consecutive protrusions; they may be arranged next to one another, without an intervening protrusion.

The protrusions may be concentric with one another.

The protrusions may have the shape of an elliptical ring in a plan view of the incident surface. Accordingly, each of the protrusions may surround the opening. The protrusions may be concentric elliptical rings.

The protrusions may have the shape of an annulus in a plan view (in other words, the protrusions may have the shape of a circular ring in plan view). The protrusions may be annular, concentric protrusions. The concentric protrusions may be centred on the opening.

Each of the protrusions may be elongate and tapered. Each of the recesses may be elongate and tapered.

The protrusions extend along a length (e.g. a circumference). Each protrusion may be tapered from the perspective of a cross section orthogonal to the direction in which the protrusion extends. In an example, the protrusions extend around the opening to define an elliptical ring in plan view. In this case, the protrusions are tapered from the perspective of a cross section orthogonal to a direction tangential to the elliptical ring.

The recesses extend along a length (e.g. a circumference). Each recess may be tapered from the perspective of a cross section orthogonal to the direction in which the recess extends. In an example, the recesses extend around the opening to define an elliptical ring in plan view. In this case, the recesses are tapered from the perspective of a cross section orthogonal to a direction tangential to the elliptical ring.

The protrusions may taper linearly. Each protrusion may taper to an apex.

The ratio of a height, h, of each protrusion to a width, w, of a neighbouring recess is at least 0.001 and equal to or less than 1.

The height of the protrusion is the largest dimension of the protrusion in the direction out of the plane of the sample holder. Where recesses are between protrusions, the height is the difference between the highest point on the protrusion and the lowest point in the recess.

The width of the recess is the largest distance between neighbouring (consecutive) protrusions in a direction orthogonal to the height and orthogonal to a direction in which the recess extends. From the perspective of a cross section orthogonal to the direction in which the recess extends, the width is the largest distance between the protrusions in a direction orthogonal to the height. Where the recesses are circular, the width is in a direction orthogonal to the tangential direction.

A neighbouring recess is a recess immediately next to the protrusion. A protrusion may have a neighbouring recess on either side.

By providing a height to width ratio that is at least 0.001, background scattering at 2θ angles of less than 0.23 degrees can be reduced.

Preferably, the height to width ratio is at least 0.01. Accordingly, X-rays irradiating the a floor of the recess, at an incident angle of less than 1.1 degrees, which are reflected, will be blocked by the neighbouring protrusion (which is arranged between the recess and the sample). The height to width ratio is preferably less than about 0.1. In this way, the incident surface is tailored to minimise background scattering at low incident angles. Additionally, by reducing the height to width ratio, the sample holder can be cleaned more easily.

The incident surface may comprise a first region comprising a plurality of protrusions and recesses, and a second region comprising a plurality of protrusions and recesses, wherein the first region and the second region are separated from one another by a separation recess having a width that is larger than a width of each of the recesses in the first region and the second region.

The width of the separation recess is the largest distance between the protrusion of the first region adjacent to the separation recess and the protrusion of the second region adjacent to the separation recess, in a direction orthogonal to the height of the protrusions and orthogonal to the direction in which the separation recess extends.

Where the protrusions and/or recesses are circular, or elliptic, the protrusions and/or recesses extend in a circumferential direction. The width of the recess/protrusion is the largest dimension of the recess/protrusion in a radial direction. From the perspective of a cross section orthogonal to the direction in which the separation recess extends, the width is the largest distance between the protrusions in a direction orthogonal to height.

The width of the recess separating the first and second regions may be at least twice the width of the recesses in the first and second regions, or at least five times the width of the recesses in the first and second regions.

The height to width ratio of the separation recess may be equal to the height to width ratio of the recesses in the first and/or second regions. Providing a relatively wide separation recess between the first and second regions reduces the number of protrusions/recesses that must be formed. It can therefore enable the sample holder to be manufactured relatively quickly. Additionally, providing the relatively wide separation recess reduces the number of protrusion tips, which can help to minimise background scattering.

The protrusions and recesses may define a substantially circularly symmetric pattern.

The protrusions and/or recesses may define a substantially circularly symmetric pattern in a plan view of the incident surface. Concentric circular protrusions/recesses are circularly symmetric. Accordingly, the sample holder can be conveniently used in X-ray analysis applications in which the sample is rotated during the measurement. For example, in X-ray diffraction analysis of powder samples, the sample is typically rotated 360 degrees at each incident angle.

The sample holder may further comprise a recess and the recess may form a spiral shape, wherein the ratio of a height, h, of the protrusion to a width, w, of the recess is at least 0.001 and less than 1. In this embodiment, the recess forms a spiral shape in a plan view of the incident surface. The spiral defined by the protrusion and recess (in plan view) is approximately circularly symmetric. Preferably, the height to width ratio is at least 0.01 and less than 1. More preferably, the height to width ratio is less than 0.5, or less than 0.1. Most preferably, the height to width ratio is at least 0.01 and less than 0.1. The protrusion may be tapered. The protrusion may extend around the opening, preferably in a spiral shape (in plan view). The protrusion may be tapered from the perspective of a cross section orthogonal to the direction in which the protrusion extends.

The opening may extend all the way through the body, and the sample holder may further comprise a sample holder base, which co-operates with the body and the opening to define a cavity for containing the sample. Accordingly, the sample can be contained by the sample holder in the cavity defined between a sidewall of the body defining the opening, and the sample holder base.

The body of the sample holder may be metallic. By providing a metallic body, the sample holder can be detected easily. For example, in use, the X-ray analysis apparatus (such as an X-ray diffraction apparatus) may comprise inductive proximity sensors which can detect metal targets (in this case, the sample holder). It is accordingly possible to determine whether or not the sample holder is in the correct position for carrying out the X-ray analysis measurements in a convenient manner. This can help to ensure that the sample is correctly aligned and/or to trigger the apparatus to carry out a measurement automatically. By providing a metallic body, the sample holder is durable and can withstand potential wear caused by frequent rotation. Additionally, the sample holder is long-lasting and can withstand frequent cleaning.

According to another aspect of the invention, there is provided an X-ray diffraction apparatus. The X-ray diffraction apparatus may comprise:
- a sample stage for supporting a sample;
- a sample holder as described above;
- an X-ray source arranged to irradiate the sample with incident X-rays; and
- an X-ray detector arranged to detect X-rays diffracted by the sample.

The sample stage may be configured to rotate the sample holder about a central axis perpendicular to the plane of the sample holder, thereby rotating the sample. Preferably, the X-ray source and X-ray detector are mounted to a goniometer.

According to another aspect of the invention, there is provided a method of carrying out X-ray analysis of a sample, the method comprising:
- providing a sample holder, the sample holder comprising:
  - a body having an incident surface and a base;
  - an opening in the incident surface for receiving the sample, the opening extending from the incident surface towards the base, wherein the incident surface comprises a protrusion for blocking at least some incident X-rays;
- the method further comprising:
- inserting the sample into the opening of the sample holder; and
- irradiating the sample and the area surrounding the sample with a plurality of X-rays, such that the protrusion and the opening are irradiated by the X-rays, wherein the incident angle of the X-rays is less than 1.5 degrees.

Preferably, the method comprises irradiating the sample with X-rays at an incident angle of equal to or less than 1 degree. The sample is only provided in the opening; the incident surface is free of the sample and is therefore exposed to incident X-rays. Accordingly, the sample is not present in the recess. The incident surface may comprise multiple recesses and multiple protrusions. The sample holder may otherwise be as described above. The sample may be powder, and the method may comprise rotating the sample. The surface of the sample to be irradiated by X-rays is co-planar with a reference plane in which the upper surface(s) of the protrusion(s) lie(s). With this approach, the reference plane can be used as a reference for the location of the incident surface of the sample.

BRIEF DESCRIPTION OF THE DRAWINGS

Embodiments of the present invention will now be described, by way of example, with reference to the accompanying drawings, in which.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION

Figure 1:
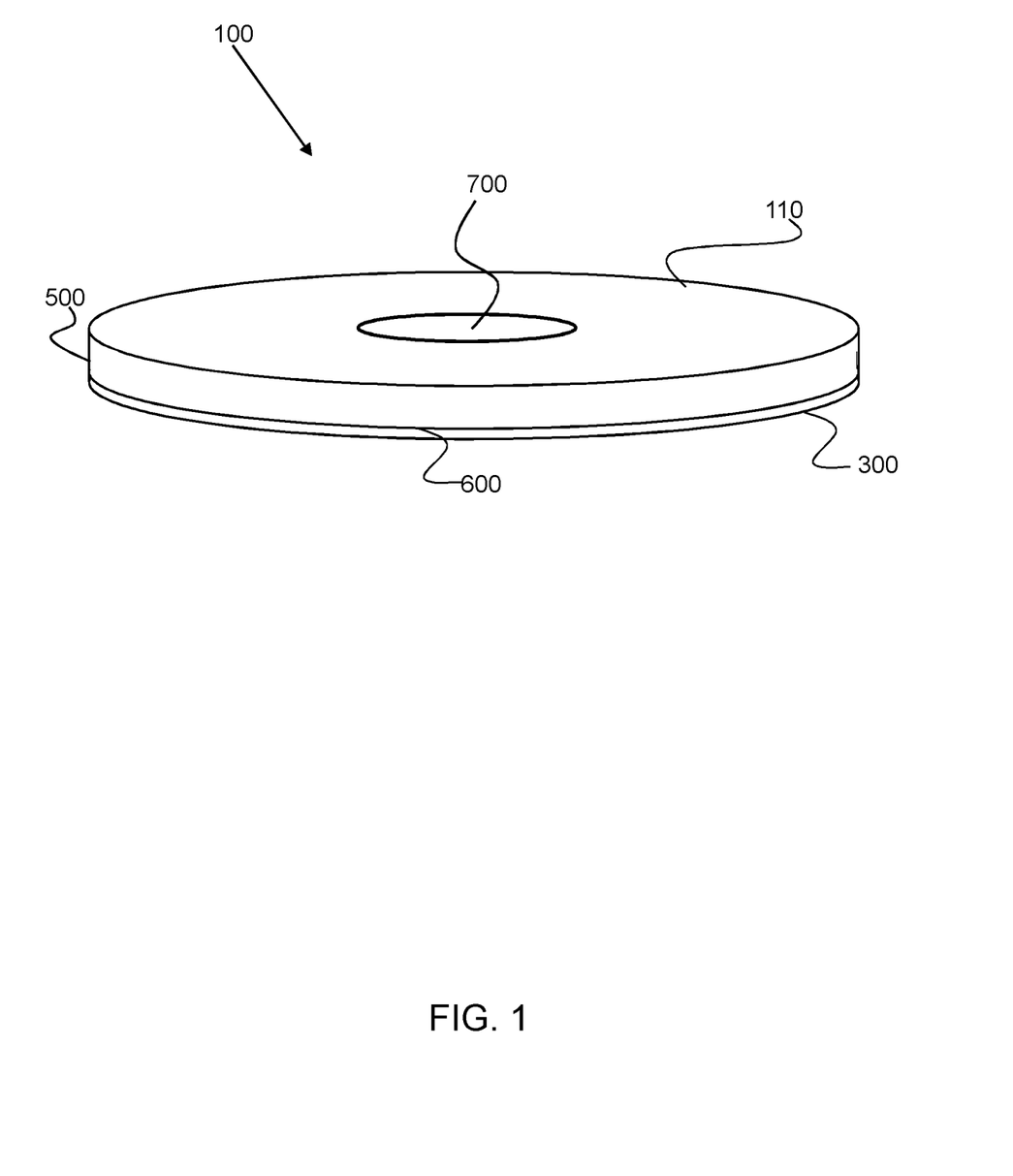
FIG. 1 is a schematic diagram of a sample holder known in the art.

Referring firstly to FIG. 1, a schematic diagram of a sample holder 100, for holding a powder sample, known in the art is shown. The sample holder 100 comprises a base 300 and a body 500. The body 500 is an annular steel plate. One major surface of the plate forms a base 600 of the body and the other major surface forms the incident surface 110. An opening 700 extends all the way through the centre of the plate, in a direction from the incident surface 110 to the base 600 of the body 500. The opening 700 is in the centre of the body, and the incident surface 110 is peripheral to the opening. The body 500 and the base 300 of the sample holder are coupled together, so that the base 300 of the sample holder—together with the sidewall defining the opening 700—forms a cavity for holding the sample.

In use, the sample is inserted into the opening 700, such that the surface of the sample is aligned with the incident surface 110 of the sample holder 100. An incident X-ray beam is directed towards the sample to irradiate the surface of the sample with X-rays. If the size and shape of the incident X-ray beam does not exactly match the size and shape of the opening 700, the surface of the body 500 surrounding the opening 700 may also be irradiated by X-rays. Accordingly, the incident X-ray beam may also irradiate at least part of the incident surface 110 of the body 500. This can give rise to unwanted "background scattering" (i.e. scattering associated with a source other than the sample which is being measured), which may compromise the accuracy of X-ray analysis results. The inventors have realised that this is especially significant at low incident angles (e.g. less than 1.5 degrees). This is because, at low angles, a larger area of the sample holder is irradiated by X-rays. Additionally, the scattered/diffracted X-ray signal from the sample holder is stronger at low incident angles.

Figure 2:
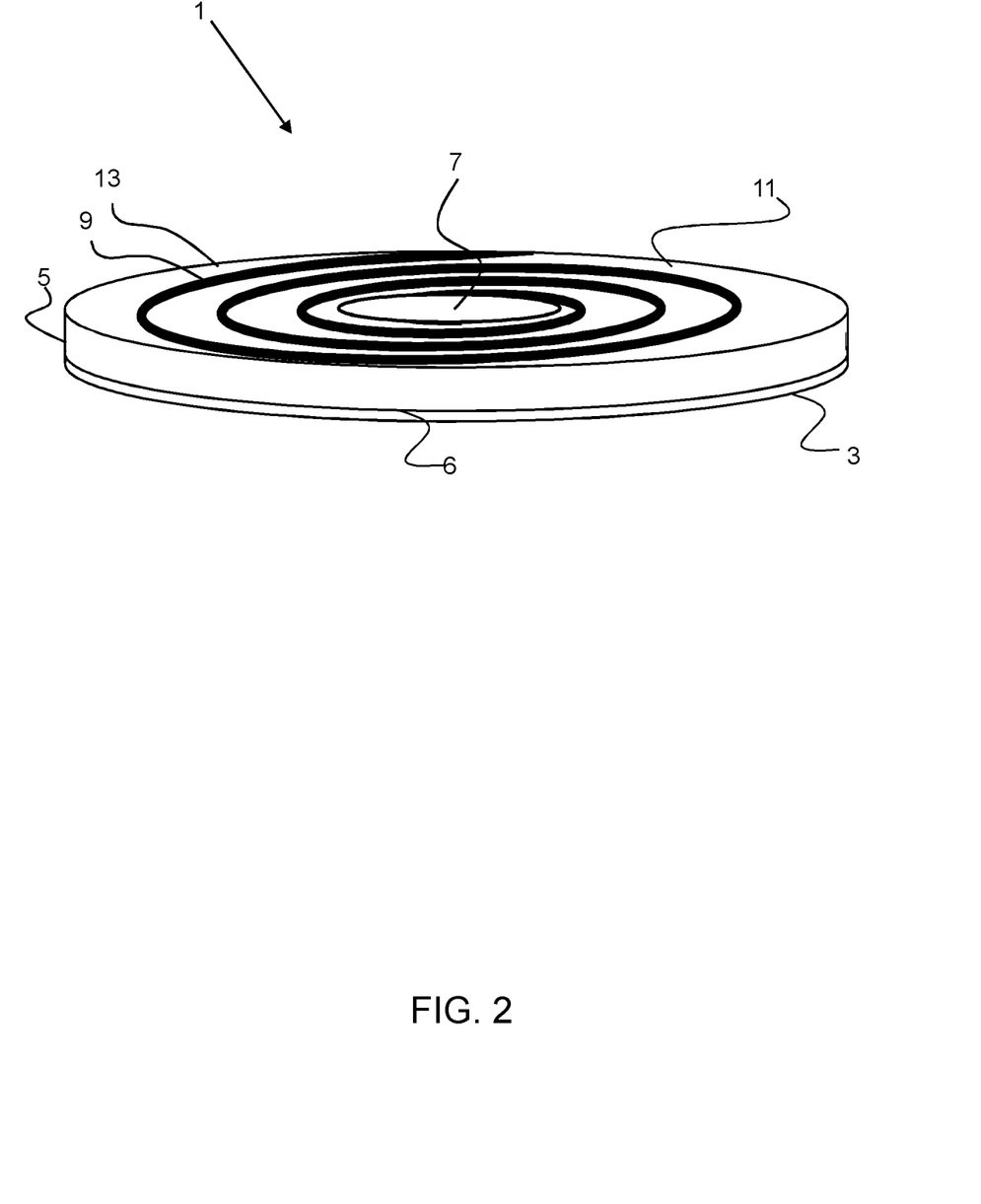
FIG. 2 is a schematic diagram of a sample holder according to an embodiment of the invention, in a perspective view, the sample holder comprising a single protrusion and a single recess.

FIG. 2 shows a sample holder 1 for holding a powder sample according to an embodiment of the invention, which can minimise "background scattering" which may be associated with the known sample holder 100 shown in FIG. 1—even though a lot of the basic features of the respective sample holders are similar.

For example, and now referring to FIG. 2, the sample holder 1 also comprises a base 3 and a body 5. The body 5 is also an annular steel plate. Again, one major surface of the plate forms a base 6 of the body and the other major surface forms the incident surface 11. An opening 7 extends all the way through the centre of the plate, in a direction from the incident surface 11 to the base 6 of the body 5. The opening 7 is in the centre of the body, and the incident surface 11 is peripheral to the opening. The body 5 and the base 3 of the sample holder are coupled together, so that the base 3 of the sample holder—together with the sidewall defining the opening 7—forms a cavity for holding the sample.

The main difference between the sample holder 1, shown in FIG. 2, and the sample holder 100, shown in FIG. 1, is that the incident surface 11 of the body 5 comprises a protrusion 13 and a recess 9 which extend around the opening 7. The protrusion 13 extends along a path that defines a spiral shape, in plan view, that is centred on the opening. The protrusion spirals inwardly from the circumference of the incident surface 11 towards and winding around the opening 7. The patterned feature of the surface 11 surrounding the opening 7 (i.e. the presence of the protrusion and recess) assists in reducing/avoiding unwanted background scattering. This will be explained in more detail, later in the description.

In a similar manner as described in relation to FIG. 1, in use of the sample holder 1 of FIG. 2, the sample is inserted into the opening 7. However, unlike the prior art sample holder 100 described in FIG. 1, the surface of the sample is aligned with the top of the protrusion 13 (that winds around the opening 7) of the sample holder 1. An incident X-ray beam is directed towards the sample to irradiate the surface of the sample with X-rays. In this case, even if the size and shape of the incident X-ray beam does not exactly match the size and shape of the opening 7, and the surface of the body 5 surrounding the opening 7 is also irradiated by X-rays, the protrusion 13 will block at least some incident X-rays at the recess 9/incident surface 11. The ability to block scattered/diffracted X-rays that are not associated with the sample itself (i.e. X-rays scattered/diffracted by the sample holder) is especially significant at low incident angles (e.g. less than 1.5 degrees), where more X-rays irradiate the sample holder, and are scattered/diffracted by the sample holder, and thus contribute more significantly to unwanted "background scattering". The ability to block scattered/diffracted X-ray signals from the sample holder at low incident angles is also particularly advantageous, as the scattered/diffracted X-ray signal from the sample holder is stronger at low incident angles.

The recess 9 also forms the shape of a spiral (as seen from a plan view). The recess 9 is defined by opposed parts of the protrusion 13. As shown in FIG. 2, the top of the protrusion 13 is substantially flat. In plan view, the pattern formed by the recess and protrusion is approximately circularly symmetric. Even though there is only a single protrusion/recess, because of the nature of the spiral, if the sample holder were to be viewed in cross-section, it may appear as multiple protrusions and recesses surrounding the opening 7.

In some embodiments, the recess 9 is formed by creating a spiral-shaped groove in the body 13. Accordingly, the body 5 and the protrusion 13 may be integrally formed.

In preferred embodiments, the ratio of the height of the protrusion 13 to the width of the recess 9 is greater than about 0.001 and less than about 0.1. In this way, at least some low-angle X-rays incident on the sample holder 1 are prevented from being scattering by the sample holder towards the detector.

Figure 3:
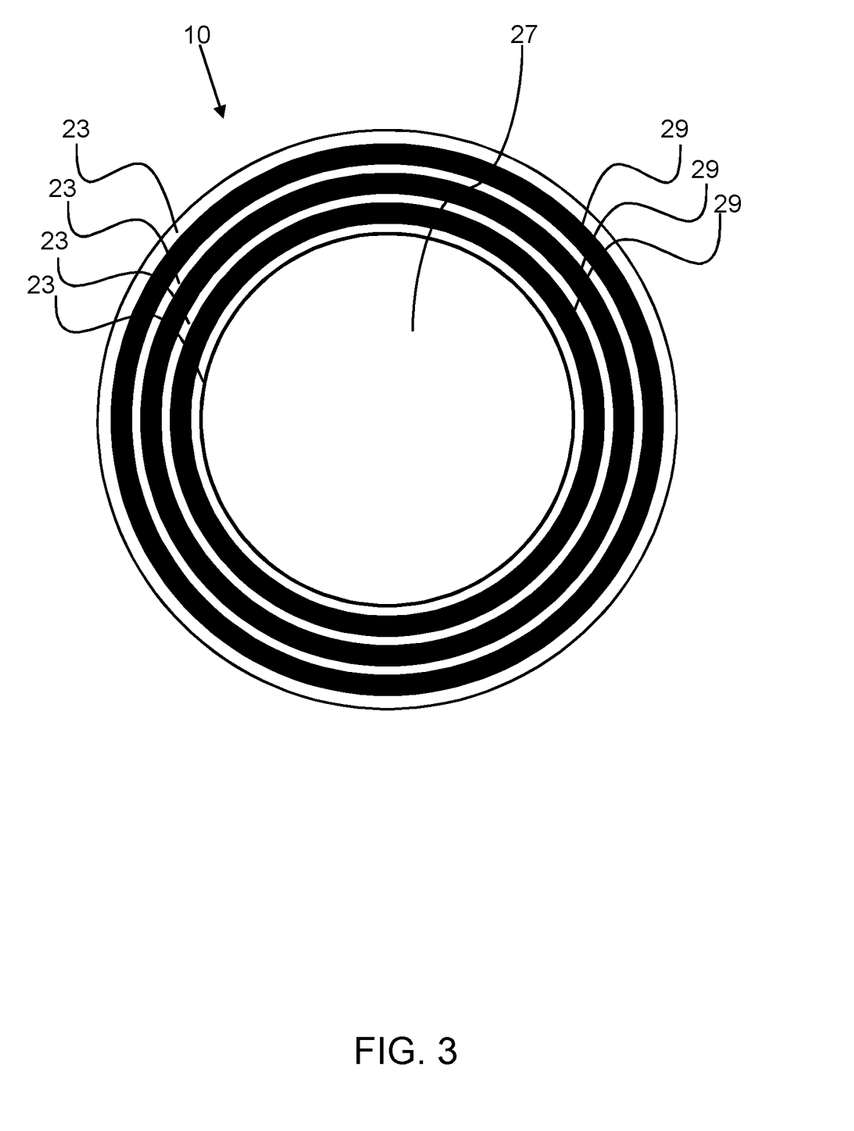
FIG. 3 is a schematic diagram of a sample holder, in plan view, the sample holder comprising multiple protrusions and recesses according to another embodiment of the invention.

FIG. 3 shows another embodiment of the sample holder 10, in plan view. The sample holder 10 has the same structure as the sample holder of FIG. 2, with the exception that the incident surface comprises multiple circular recesses and multiple circular protrusions. The recesses 29 and protrusions 23 extend around the opening 27. In this embodiment, the protrusions 23 are concentric annuli (shown as white annuli), centred around the opening 27. The recesses 29 are concentric annuli (shown as dark annuli) and are defined between neighbouring protrusions 23. Accordingly, as shown in FIG. 3, the incident surface is circularly symmetric.

The width of the recess 29 is the dimension, as seen from a cross section taken across a diameter of the incident surface, which extends in a radial direction between consecutive protrusions 23. The width is orthogonal to the direction in which the protrusion protrudes from the body. Each recess has the same width as the other recesses, and each protrusion has the same width as the other protrusions. Additionally, the width of each recess and each protrusion is uniform along the extent of the recess/protrusion. That is, the width is the same at each point around the annulus. The width of each recess 29 is larger than the width of each protrusion 23. The width of the protrusions is the largest dimension, in a radial direction, between consecutive recesses.

Figure 4:
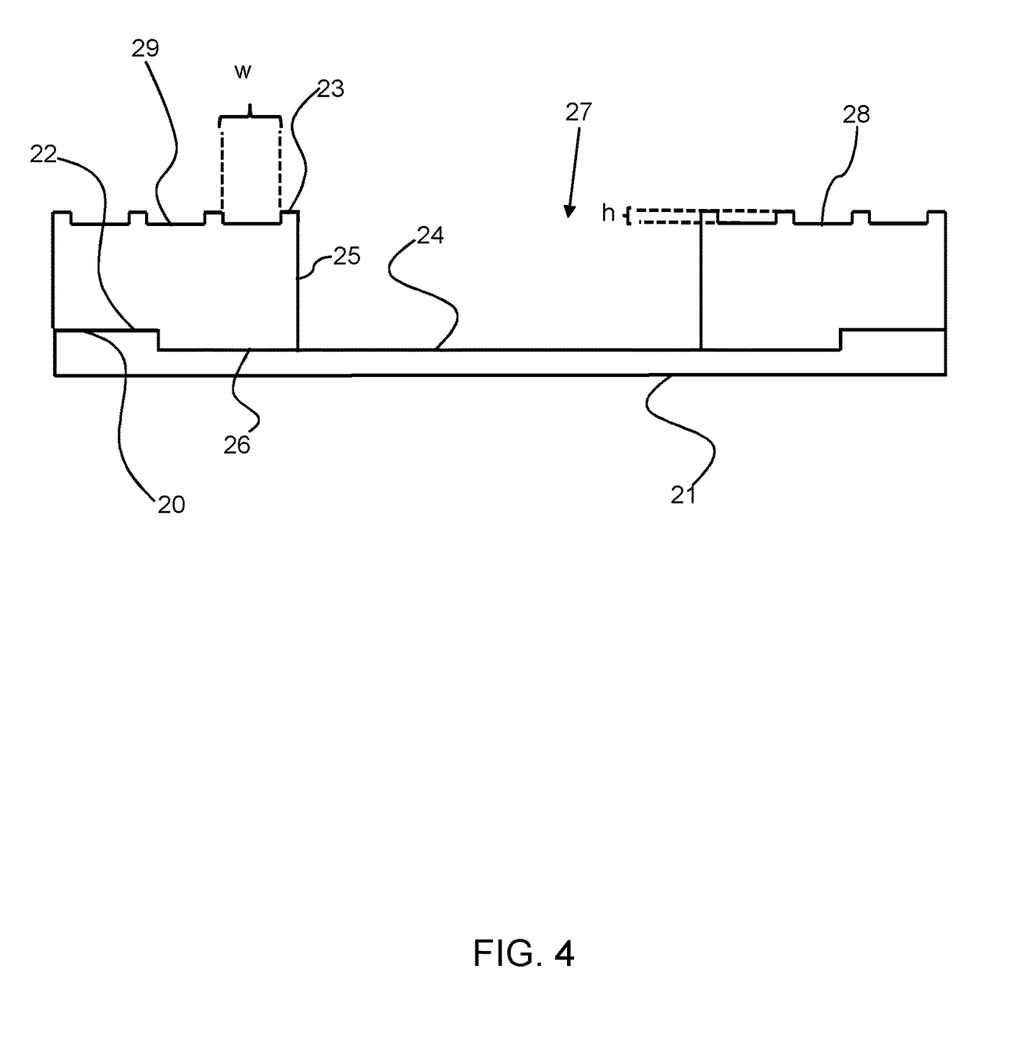
FIG. 4 is a schematic diagram of the sample holder of FIG. 3, in cross section.

FIG. 4 illustrates the sample holder 10 of FIG. 3 in cross section (in a plane orthogonal to the plan view in FIG. 3). The cross section of FIG. 3 is in a plane orthogonal to a tangential direction (i.e. a direction tangential to the protrusions and recesses).

The base 21 of the sample holder is a plate having an annular projection 20 around its circumference. The base 26 of the body 25 has an annular location slot 22, which co-operates with annular projection 20 in the base 21 of the sample holder 10 to mate the body 25 and the base 21 together. The opening 27 extends all the way through the body 25. Accordingly, the sidewalls of the opening 27 in the body 25 and the part of the base 23 of the sample holder under the opening 27 define the cavity 24 for containing the sample.

Each protrusion 23 comprises an outer sidewall, and an inner sidewall. The inner sidewall is on the same side of the protrusion as the opening. The outer sidewall is on the opposite side of the protrusion to the opening. The outer sidewall extends around the largest circumference of the annulus, and the inner sidewall extends around the smallest circumference of the annulus. The top of the protrusion 23 extends between the two sidewalls. Each recess 29 is defined between neighbouring protrusions 23. That is, it is defined between the inner sidewall of a first protrusion 23 and the outer sidewall of the next (second) protrusion 23 positioned at a radial position closer to the opening 27 than the first protrusion. At the bottom of the recess, the floor 28 of the recess extends between the outer sidewall and the inner sidewall. The top of the recess is open and co-planar with the tops of the protrusions.

Each protrusion has a height and a width. The height of a protrusion 23 is the largest dimension of the protrusion in the direction in which the protrusion protrudes from the body 25. The width of the protrusion is the largest dimension of the protrusion in a radial direction. The depth of a recess is equal to the heights of the protrusions on either side of the recess. The width of a recess 29 is the distance between neighbouring protrusions, in the plane orthogonal to the tangential direction, and in a radial direction.

The width of the recess is between 10 μm and 10 mm. The height of the protrusion is between 0.5 μm and 1 mm. The width of the protrusion is less than 0.5 mm. The ratio between the height of the protrusion and the width of the recess is at least 0.001 and preferably at least 0.01. The ratio between the height of the protrusion and the width of the recess is preferably less than 1, more preferably less than about 0.1.

By providing an arrangement in which the height to width ratio of a protrusion and its neighbouring recess is greater than about 0.001 and less than about 0.1, at least some low-angle X-rays incident on the sample holder are prevented from being scattering by the sample holder towards the detector.

As mentioned, in preferred embodiments, the ratio of the height (h) of a protrusion to the width (w) of a neighbouring recess is at least 0.01. This helps to reduce background scattering at measurements taken at 2θ angles of about 2.3 degrees or lower (in Bragg Brentano (symmetric) geometry). Background scattering is particularly problematic over this range, since it is particularly difficult to avoid irradiating the sample holder at these very low angles. As an example, the protrusions have a height of 0.05 mm and a width of 0.05 mm. The width of each recess is 0.3 mm. Accordingly, the height to width ratio is approximately 0.17.

Figure 5:
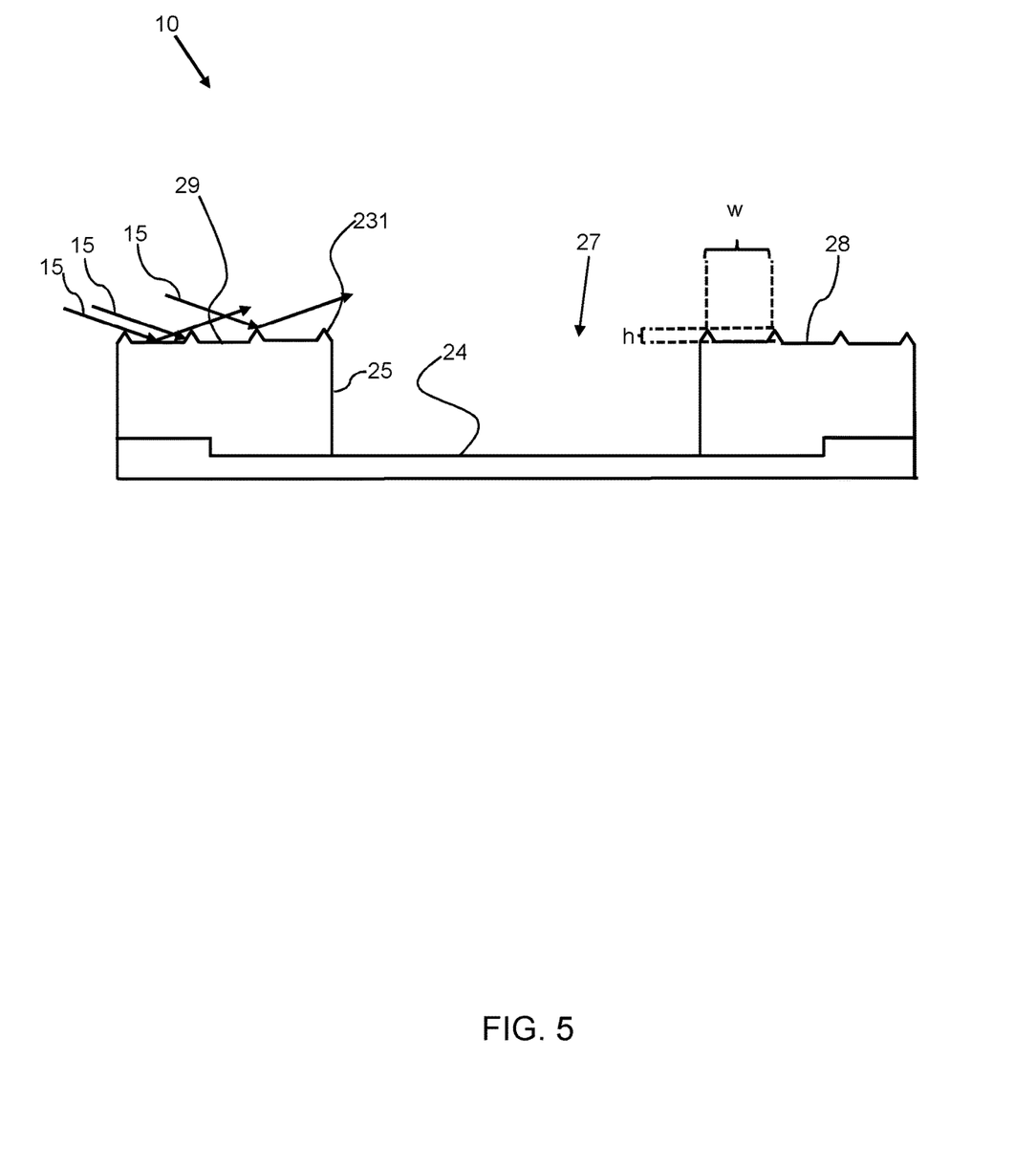
FIG. 5 is a schematic diagram of a sample holder according to another embodiment of the invention, in cross section.

FIG. 5 illustrates another embodiment, in which the sample holder 10 of FIGS. 3 and 4 has tapered recesses and protrusions. As shown in FIG. 5, the protrusion 231 reduces in width towards its tip. By providing tapered protrusions 231, the surface area at the top of the protrusion 231 is minimised which can help to further reduce background scattering. By minimising the surface area at the tip of the protrusions 231, the potential for incident X-rays scattering from the tips of the protrusions 231 is minimised. The recesses 29 are also tapered; the width at the floor 28 of the recess 29 is narrower than the width at the top of the recess, opposite the floor 28.

In embodiments in which the protrusions 231 taper to an apex, the width of the recess 29 is the distance from the tip of one protrusion to tip of the next (i.e. neighbouring) protrusion. The width of the recess may be between 10 μm and 10 mm. The height of the protrusion may be between 0.5 μm and 1 mm, and the width of the protrusion may be less than 0.5 mm. The ratio between the height of a protrusion and the width of a neighbouring recess is at least 0.01. The ratio between the height of a protrusion and the width of a neighbouring recess is preferably less than about 0.1.

By providing an arrangement in which the height to width ratio of a protrusion and its neighbouring recess is greater than about 0.001 and less than about 0.1, at least some low-angle incident X-rays can be prevented from scattering from the sample holder towards the detector.

In preferred embodiments, the ratio of the height (h) of a protrusion to the width (w) of a neighbouring recess is at least 0.01. This helps to reduce background scattering at measurements taken at 2θ angles of about 2.3 degrees or lower (in Bragg Brentano (symmetric) geometry). Background scattering is particularly problematic over this range, since it is particularly difficult to avoid irradiating the sample holder at these very low angles. Providing protrusions having the specified height to width ratio may result in the majority of scattered/diffracted X-rays associated with the sample holder being blocked from being transmitted to the X-ray detector, meaning that X-ray signal transmission from the sample holder is significantly reduced (for example, to essentially undetectable levels).

As shown in FIG. 5, in use, incident X-rays 15 irradiate the sample (not shown) as well as the sample holder 10. Some of the incident X-rays 15 are reflected at the floor 28 of the recess 29, and may be detected along with X-rays from the sample. However, some of the incident X-rays are blocked by the protrusions 231 formed between the recesses. Additionally, some of the X-rays reflected at the floors 28 of the recesses 29 are blocked by the protrusions 231.

Figure 6:
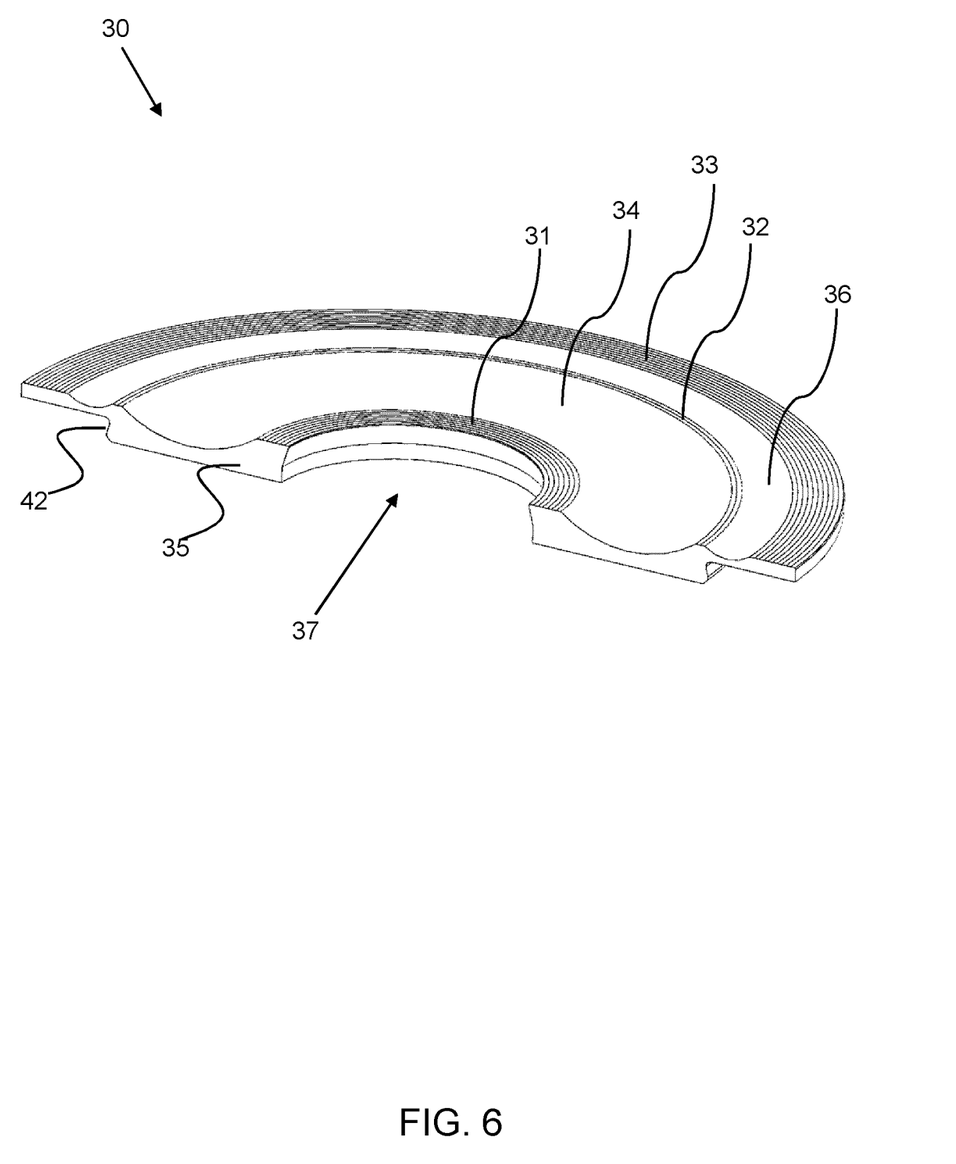
FIG. 6 is a schematic diagram of a section of a sample holder, in perspective view, according to another embodiment of the invention.

FIG. 6 shows a sectional view of another embodiment of the sample holder 30 (showing just the body 35, without the base of the sample holder). The sample holder is annular (in plan view), and has an opening 37 extending all the way through the body 35. A location slot 42 is formed in the base of the sample holder. In this embodiment, the incident surface of the sample holder 30 comprises five regions. Three of the regions (the first to third regions) comprise recesses and protrusions that are of the same dimensions as the recesses and protrusions in the other of the first to third regions. The first to third regions occupy approximately 40 percent of the incident surface. The first region 31 is the region proximate the opening 37. The third region 33 extends around the circumference of the body 35. The second region 32 is between the first and third regions 31, 33. The first region 31 and the second region 32 are separated by a fourth region 34, which comprises a single recess. The fifth region 36 is between the second region 32 and the third region 33, and also comprises a single recess. The recess in the fourth region 34 has a width that is larger than the widths of the recesses in the first to third and fifth regions. The recess in the fifth region has a width that is larger than the widths of the recess in the first to third regions. However, the height to width ratio for the recesses of the fourth and fifth regions is the same as the height to width ratio for the protrusions and recesses in the first and second regions.

In FIG. 6, the depth of the recess is the largest dimension of the recess, as viewed in a cross section orthogonal to a tangential direction, in a direction orthogonal to the radial direction.

Figure 7:
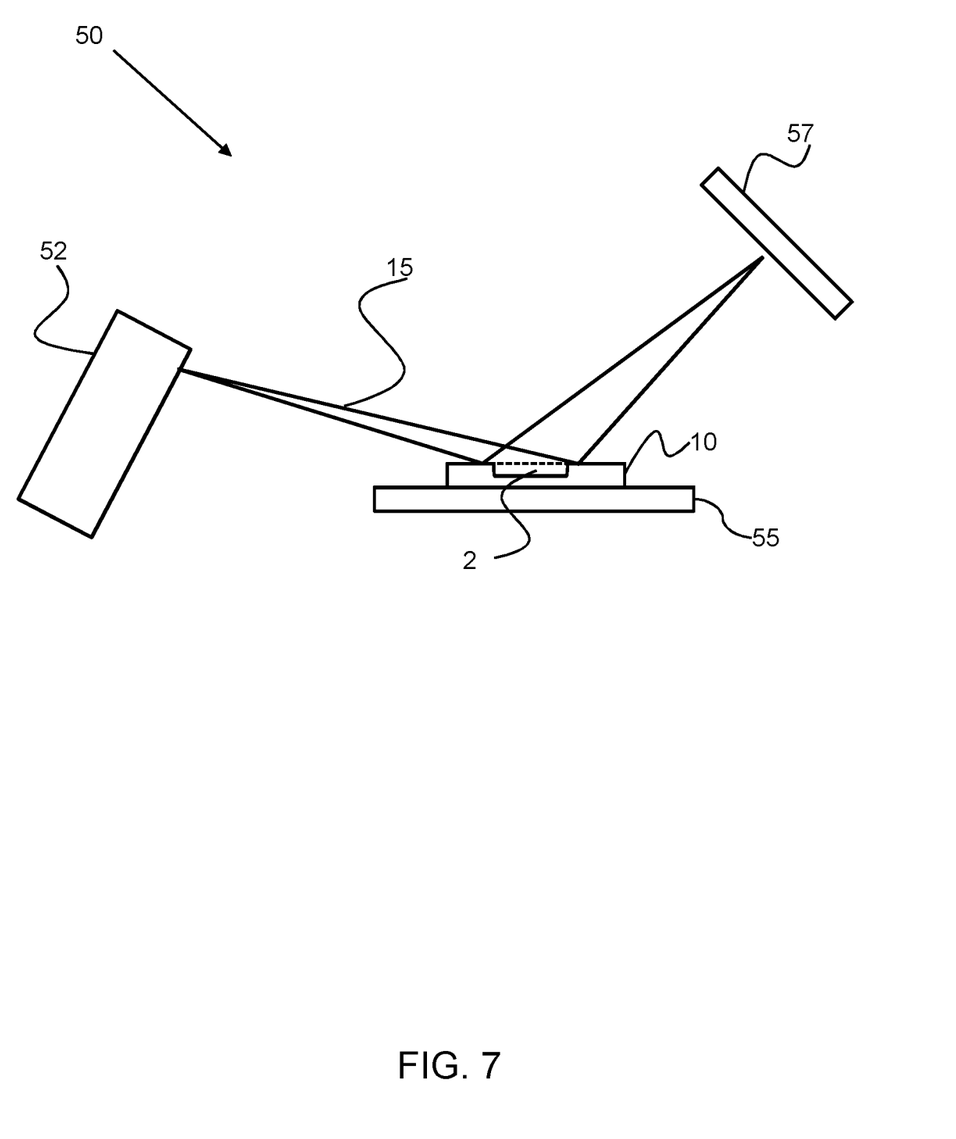
FIG. 7 is a schematic diagram of an X-ray analysis apparatus according to an embodiment of the invention.

FIG. 7 shows an X-ray analysis apparatus 50, according to an embodiment of the invention. The X-ray analysis apparatus is arranged in reflection geometry. The X-ray analysis apparatus comprises an X-ray tube 52 which is arranged to irradiate a sample 2 (e.g. a powder sample). The sample 2 is contained in the sample holder 10, which is supported by the sample stage 55. The cavity of the sample holder 1 is filled with the sample, so that the tips of the protrusions (not shown in FIG. 7, for simplicity) lie in the same plane as the incident surface of the sample 2. In this way, the tips of the protrusions lie in a reference plane for the incident surface of the sample 2. An X-ray detector 57 is arranged to receive X-rays diffracted by the sample 2.

In embodiments in which the pattern of recesses and protrusions of the incident surface of the sample holder 1 is circularly symmetric, the sample stage is configured to rotate the sample holder 1 about a central axis orthogonal to the incident surface of the sample (and which passes through both of the opposed major surfaces of the sample holder). In particular, the sample stage may comprise roller bearings arranged above the sample holder, and configured to contact the incident surface, or the edge of the sample holder 1, at discrete locations about the circumference of the sample holder 1. The sample stage rotates the sample holder about the central axis, by a motor arranged under the sample holder. The roller bearings guide the incident surface, defining a fixed plane in which the incident surface rotates.

Figure 8:
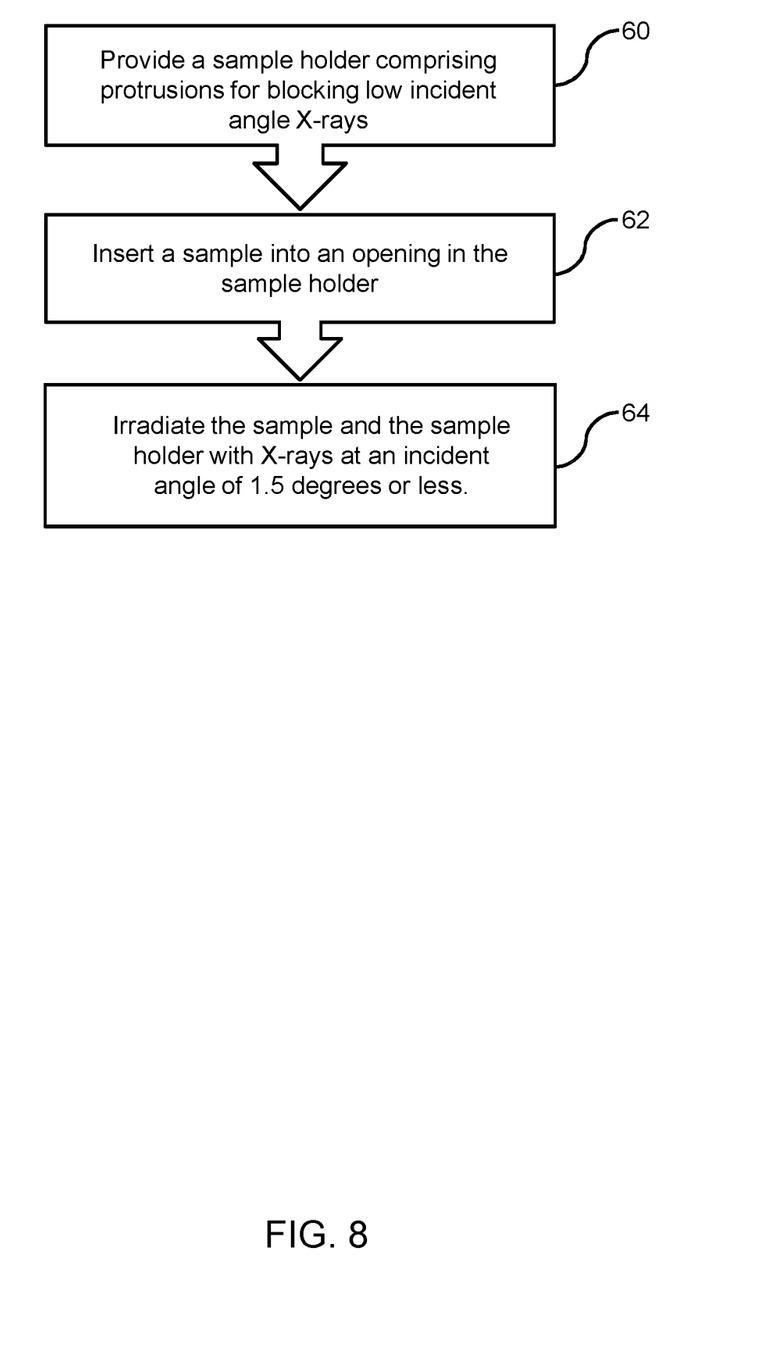
FIG. 8 illustrates a method according to an embodiment of the invention.

FIG. 8 illustrates a method of using a sample holder, according to an embodiment of the invention. The sample holder comprises a body having an opening for receiving the sample extending from its incident surface, towards the base of the body. The incident surface comprises at least one protrusion. In an initial step 60, the sample holder is provided. In an insertion step 62, the sample 2 is inserted into the opening of the sample holder 1. The cavity is filled with the sample 2, so that the incident surface of the sample is co-planar with a reference plane in which the tip(s) of the protrusion(s) lie(s). With this approach, the reference plane can be used as a reference for the location of the incident surface of the sample 2. The sample is only inserted into the opening; the surface surrounding the opening that includes the recesses and protrusions is free of the sample.

In a subsequent step, the sample holder is placed on the sample stage. In some embodiments, the sample holder is metallic and the X-ray apparatus includes a sensor (e.g. an inductive proximity sensor), which can be used to detect the presence of the sample holder.

In an irradiation step, 64, the X-ray sample is irradiated with X-rays, over a range of incident angles, $\theta$, including angles less than 1.5 degrees. The X-ray detector is arranged at a detection angle, $2\theta$, to receive X-rays diffracted by the powder sample. At each incident angle, $\theta$, the sample stage may rotate the sample holder about the central axis. In this way, X-ray diffraction can be detected at various rotation angles of the sample.

It will be understood by the skilled person that the sample holder need not have a circular/annular shape (in plan view). The shape, in plan view, may be elliptical, or any other shape. Additionally, the opening may not have a circular shape in plan view. It may be elliptic, or any other shape.

The sample holder could have multiple discrete protrusions arranged in a spiral shape, rather than a singular protrusion.

The protrusions and recesses extend around the opening.

Although only four protrusions are shown in FIGS. 3 to 5, the sample holder could have any number of protrusions. For example, greater than 20 or greater than 100.

Although only three recesses are shown in FIGS. 3 to 5, the sample holder could have any number of recesses. For example, greater than 20 or greater than 100.

In embodiments, the recesses may be formed by providing a roughened surface. For example, by sandblasting. However, sample holders comprising a spiral protrusion, concentric elliptical protrusions, or concentric circular protrusions have been found to achieve even better suppression of background scattering whilst also achieving acceptable durability. It is desirable that the patterns are not prone to wear after being subject to prolonged rotation by roller bearings which rotate the sample holder by direct contact of the roller bearing with the surface of the body.

The recess/recesses and/or protrusion/protrusions may have uniform cross section in a plane orthogonal to the extent of the recesses/protrusions—for example, a plane perpendicular to a tangential direction, in a circularly symmetric holder (e.g. concentric circular grooves), or approximately circularly symmetric holder (e.g. one or more spiral grooves).

Where the sample holder comprises a plurality of recesses, the recesses may have the same width as one another or at least one of the recesses may have a different width to another of the recesses. Likewise, the protrusions may each have the same width as the other protrusions, or at least one of the protrusions may have a different width to another of the protrusions.

The protrusion or each of the protrusions may have a uniform width. The protrusions may have the same uniform width. The protrusion or each of the protrusions may have a uniform height. The protrusions may have the same uniform height.

The recess or each of the recesses may have a uniform width.

The height of each protrusion is equal to the depth of the recess defined between the protrusion and its neighbouring protrusion.

The recess or recesses may be symmetrical in cross section in a plane orthogonal to the extent of the recess, or they may be asymmetrical.

The protrusion or protrusions may be symmetrical in cross section in a plane orthogonal to the extent of the protrusion/protrusions, or they may be asymmetrical.

The walls of the protrusions may be straight in cross section in a plane orthogonal to the extent of the protrusion/protrusions, or they may be curved.

The slope of the walls of the protrusions/protrusion may be less than 30 degrees, or less than 10 degrees.

The distance from the outer extremity of a protrusion to the corresponding outer extremity of the next protrusion (i.e. the pitch, or period, of the pattern defined by the protrusions) is at least 10 µm, preferably at least 300 µm.

The floor of the recess may be flat.

The protrusions may taper to an apex, or the tips of the protrusions may be truncated. The protrusions may taper to a point (for example, the protrusions may have an inverted v shape) in cross section in a plane orthogonal to the extent of the protrusion/protrusions. Alternatively, the protrusions may be truncated. For example, in cross section, they may have the shape of a truncated triangle pyramid.

The recesses may be "elongate" or not (for example, the recesses may be pyramidal or cone shaped).

The protrusions are elongate. Elongate protrusions may be linear (e.g. line-shaped, chevron shaped, zig-zag shaped), or they may be curved (e.g. elliptical in plan view). The linear protrusions may define a pattern, such as a honeycomb pattern.

Additionally, the sample holder need not be steel. It may be of any material that is substantially opaque to X-rays. For example, the sample holder may comprise brass.

The sample holder does not necessarily comprise a base that is separate to the body. In some embodiments, the opening may only extend part way through the body to form a cavity for containing the sample. In some other embodiments, the opening extends entirely through the body, and the cavity is defined by the opening together with the surface on which the sample holder rests. For example, the cavity may be defined by the sidewall of the body defining opening and the surface of the sample stage.

The opening may not extend entirely through the body of the sample holder. In some embodiments, the opening may extend only partly through the body of the sample holder. This avoids the need to couple to sample holder to a base.

The body may be coated with, for example, a Nickel coating.

The base of the body may have an annular location slot, and the base of the sample holder may have an annular projection. The location slot and projection co-operate to mate the body of the sample holder and the base of the sample holder together. However, the body and the base may be coupled in a different way.

The sample holder may comprise a metal body and the X-ray apparatus may include a magnetic sensor, an optical sensor or another type of sensor capable of detecting the metal body.

The invention claimed is:

1. A sample holder for holding a sample, the sample holder comprising:
   a body having a base and an incident surface;

an opening (7) in the body for receiving the sample, the opening extending from the incident surface towards the base; and wherein the incident surface comprises a plurality of concentric protrusion for blocking at least some X-rays incident on the incident surface and a plurality of recesses, wherein the protrusions are is formed in a region surrounding the opening.

2. The sample holder of claim 1, wherein each protrusion surrounds the opening and a recess is defined between each protrusion and a neighbouring protrusion.

3. The sample holder of claim 1, wherein the ratio of a height, h, of each protrusion to a width, w, of a neighbouring recess is at least 0.001 and equal to or less than 1.

4. The sample holder of claim 1, wherein the incident surface comprises a first region comprising a plurality of protrusions and recesses, and a second region comprising a plurality of protrusions and recesses, wherein the first region and the second region are separated from one another by a separation recess having a width that is larger than a width of each of the recesses in the first region and the second region.

5. The sample holder of claim 1, wherein the protrusions (13) and recesses (9) define a substantially circularly symmetric pattern.

6. The sample holder of claim 1, wherein the opening extends all the way through the body, and the sample holder further comprises a sample holder base, which co-operates with the body and the opening to define a cavity for containing the sample.

7. The sample holder of claim 1, wherein the body of the sample holder is metallic.

8. An X-ray diffraction apparatus comprising:
a sample stage for supporting a sample;
the sample holder according to any one of the preceding claims;
an X-ray source arranged to irradiate the sample with incident X-rays; and
an X-ray detector arranged to detect X-rays diffracted by the sample.

9. A method of carrying out X-ray analysis of a sample, the method comprising:
providing a sample holder, the sample holder comprising:
a body having an incident surface and a base;
an opening in the incident surface for receiving the sample, the opening extending from the incident surface towards the base, wherein the incident surface comprises a plurality of concentric protrusions for blocking at least some incident X-rays and a plurality of recesses;
the method further comprising:
inserting the sample into the opening of the sample holder; and
irradiating the sample and the area surrounding the sample with a plurality of X-rays, such that the protrusion and the opening are irradiated by the X-rays, wherein the incident angle of the X-rays is less than 1.5 degrees.

10. The method of claim 9, wherein the protrusion of the sample holder are formed in a region surrounding the opening.

11. The method of claim 9,
wherein each protrusion surrounds the opening and a recess is defined between each protrusion and a neighbouring protrusion.

12. The sample holder of one of claim 3 or claim 11, wherein the region of the incident surface between the protrusion and the neighbouring protrusion forms a floor of the recess.

13. The method of claim 9, wherein
the ratio of a height, h, of each protrusion to a width, w, of a neighbouring recess is at least 0.001 and equal to or less than 1.

14. A sample holder for holding a sample, the sample holder comprising:
a body having a base and an incident surface;
an opening in the body for receiving the sample, the opening extending from the incident surface towards the base; and
wherein the incident surface comprises:
a protrusion for blocking at least some X-rays incident on the incident surface; and
a recess that forms a spiral shape; and
wherein the protrusion and the recess are formed in a region surrounding the opening.

15. The sample holder of claim 14 wherein the ratio of a height, h, of the protrusion to the width, w, of the recess is at least 0.001 and less than 1.

16. The sample holder of claim 14 wherein the protrusion is tapered.

17. A sample holder for holding a sample, the sample holder comprising:
a body a base and an incident surface;
an opening in the body for receiving the sample, the opening extending from the incident surface towards the base; and
wherein the incident surface comprises a plurality of protrusions for blocking at least some X-rays incident on the incident surface and a plurality of recesses, wherein the protrusions are formed in a region surrounding the opening and wherein the protrusions and recesses define a substantially circularly symmetric pattern.

* * * * *